United States Patent Office 3,167,557
Patented Jan. 26, 1965

3,167,557
PROCESS FOR THE PRODUCTION OF
VAT DYESTUFFS
Kurt Klemm, Leverkusen, Fritz Baumann, Opladen, and Hans-Samuel Bien, Leverkusen, Germany, assignors to Farbenfabriken Bayer Aktiengesellschaft, Leverkusen, Germany, a corporation of Germany
No Drawing. Filed Mar. 6, 1962, Ser. No. 177,758
Claims priority, application Germany Mar. 7, 1961
4 Claims. (Cl. 260—276)

The invention relates to novel vat dyestuffs and to a process for their production.

It is an object of the present invention to provide new vat dyestuffs. A further object is to provide dyestuffs with valuable fastness properties, especially a good fastness to boiling in soda. More objects will appear hereinafter.

It has been found that new valuable vat dyestuffs are obtained if 4-acylaminoanthraquinone-2,1(N)-1',2'(N)-benzacridone-5'-anthrimides of the general Formula 1

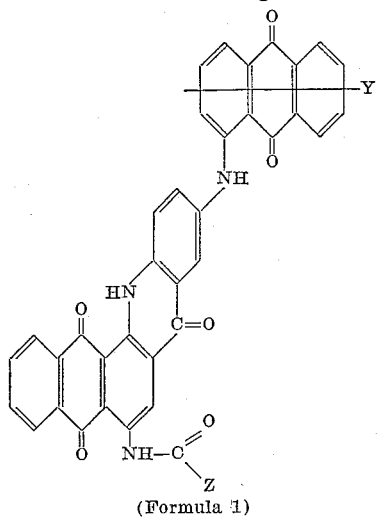

(Formula 1)

in which Y represents hydrogen, NH$_2$, an acylamino radical or a substituted or unsubstituted anthraquinonyl radical which is linked through an NH group in α-position of the anthraquinonyl radical group and Z stands for a substituted or unsubstituted alkyl or aryl group as well as an arylaminoanthraquinone or phthaloyl-carbazole radical, are converted into the corresponding carbazoles.

The new dyestuffs can be characterized by the following general Formula 2

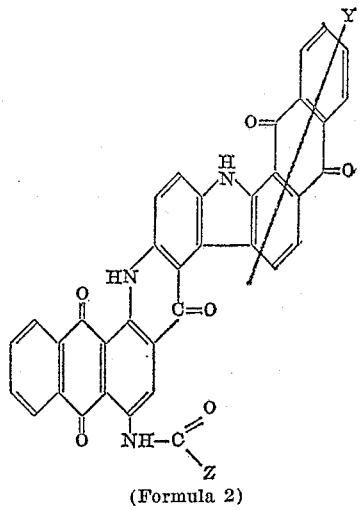

(Formula 2)

wherein Y represents a member selected from the group consisting of hydrogen, NH$_2$, an acylamino radical, substituted and unsubstituted anthraquinonyl carbazol radicals linked by way of an NH group in α-position of the anthraquinonyl radical and wherein Z stands for a member selected from the group consisting of substituted and unsubstituted alkyl and aryl groups and an arylaminoanthraquinone carbazol radical and a phthaloyl-carbazole radical.

Examples of the acylamino radicals mentioned in the above formula are aromatic radicals of the benzene and naphthalene series or hydro aromatic radicals such as cyclohexyl radicals which may contain further substituents such as alkyl radicals or halogen radicals such as fluorine, chlorine or bromine or nitro or alkylamino radicals. Examples of the anthraquinonyl radicals are the amino anthraquinone which may be substituted for example by amino or acylamino groups as defined before in the 4, 5 or 8 position. The alkyl or aryl groups which are represented by Z can be substituted in the alkyl radical for example by halogen such as bromine or chlorine or phenyl sulphone groups and in the aryl radical which might be an aromatic radical of the benzene naphthalene or cyclohexyl series by halogen or nitro or alkyl amino groups. The arylamino anthraquinone as defined in the definition of Z may be for example 1-anilido-anthraquinone or 1-anilido-4-, respectively, 5-benzoyl, respectively, cyclohexoyl aminoanthraquinone. The alkyl radicals are preferably lower alkyl radicals with up to 4 carbon atoms.

The anthrimides used according to the invention can be prepared by acylation of the 4-amino-5'-bromanthraquinone-2,1(N)-1',2'(N)-benzacridone with possibly halogen-substituted carboxylic acid halides and subsequent reaction with vatable amines of the anthraquinone series, in the manner known for the formation of anthrimides. The carbazolisation of the anthrimides used according to the invention can be effected in the usual way, for example by reacting them in an AlCl$_3$/NaCl/SO$_2$ melt at a high temperature, advantageously between 60 and 120° C.

The dyestuffs obtained by the process according to the invention dye vegetable fibres in khaki to brown tones with excellent fastness properties. They are distinguished from the known dyestuffs unsubstituted in the 4-position of the anthraquinone-2,1(N)-1',2'(N)-benzacridone by greater colour intensity and inter alia by a better fastness to boiling in soda of the dyeings.

Example 1

(a) A mixture of 23.2 parts of 4-benozylamino-5'-bromanthraquinone-2,1(N)-1',2'(N) - benzacridone, 16.7 parts of 1-amino-5-benzoylaminoanthraquinone, 7 parts of potassium carbonate 2.3 parts of anhydrous sodium acetate, 0.7 part of copper acetate, 0.3 part of copper powder and 350 parts of naphthalene are heated while stirring for 4 to 5 hours to 220° C. On completion of the reaction, the temperature is allowed to fall to 170° C., the substance is diluted with o-dichlorobenzene, filtered off at 100° C. and the residue is subsequently washed with hot o-dichlorobenzene and alcohol. Thereafter, the residue is stirred with dilute hydrochloric acid for a short time at 80° C., filtered off while hot, washed until neutral and dried. The acridone anthrimide, which has the following constitution, is soluble in concentrated sulphuric acid with a reddish-tinged yellowish-brown colour and dyes cotton grey from a red vat.

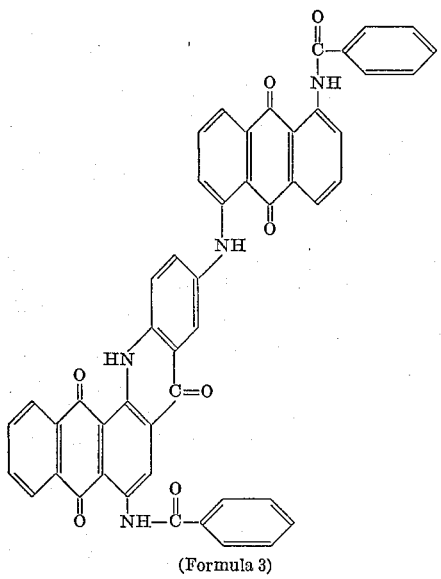

(Formula 3)

(b) 20 parts of the dried and finely powdered anthrimide obtained according to Example 1a are introduced at 65° C. into a mixture of 100 parts of anhydrous aluminium chloride and 20 parts of sodium chloride, which has been liquefied by passing over sulphur dioxide at 60–70° C., heated for 4 to 5 hours to 65–70° C. while stirring and passing over a weak stream of sulphur dioxide and thereafter the melt is decomposed by stirring into iced water. The precipitated product is suction-filtered and washed with water until neutral. The dried dark dyestuff powder is soluble in concentrated sulphuric acid with a greenish-tinged blue colour and dyes cotton in khaki tones with excellent fastness properties. The dyestuff can be designated by the following Formula 4

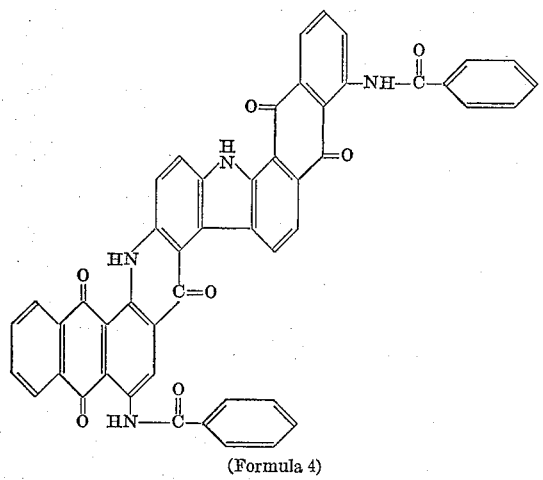

(Formula 4)

(c) The 4-benzoylamino-5'-bromanthraquinone-2,1(N)-1',2'(N)-benzacridone can be prepared as follows:
41. 6 parts of 4-amino-5'-bromanthraquinone-2,1(N)-1',2'(N)-benzacridone, 1000 parts of nitrobenzene and 7 parts of pyridine are heated to 150° C., 24 parts of benzoyl chloride are added and the mixture is stirred for 5 hours with exclusion of moisture at 160° C., allowed to cool overnight, filtered off and the residue is washed with alcohol.

(d) Instead of the 1-amino-5-benzoylaminoanthraquinone used in Example 1a, it is also possible to use the corresponding quantities of other amines of the anthraquinone series, such as 1-aminoanthraquinone, 1-amino-4-benzoylaminoanthraquinone and 5-amino-1,1'-dianthrimide, among others. The properties of these acridone anthrimides and their carbazolisation products can be seen from the following table:

| Aminoanthra-quinone | Anthrimide | | Carbazolisation products | |
| --- | --- | --- | --- | --- |
| | Colour of solution in $H_2SO_4$ | Cotton dyeing | Colour of solution in $H_2SO_4$ | Cotton dyeing |
| 1-Aminoanthra-quinone. | Yellowish-brown. | Dull corinth.. | Red...... | Khaki. |
| 1-Amino-4-benzoyl-aminoanthra-quinone. | Olive green.. | Very greenish-tinged grey. | Red....... | Grey. |
| 5-Amino-1,1'-dianthrimide. | Brownish-yellow. | Dull corinth.. | Reddish-tinged blue. | Brown. |

The fastness properties of the carbazolisation products can be further improved by subsequent acylation, for example in nitrobenzene.

Example 2

(a) 10.4 parts of 4-benzoylamino-5'-bromanthraquinone-2,1(N)-1',2'(N)-benzacridone are introduced while stirring and within 1 hour into a mixture heated to 205° C. and consisting of 7.2 parts of 1,5-diaminoanthraquinone, 3.5 parts of potassium carbonate, 2 parts of anhydrous sodium acetate, 0.5 part of copper acetate, 0.2 part of copper powder and 200 parts of naphthalene and reacted for 9 hours at 205–210° C. The melt is worked up in the manner described in Example 1a. The anthrimide, which has the following constitution, is soluble in concentrated sulphuric acid with a yellowish-brown colour and dyes cotton a corinth colour from a red vat.

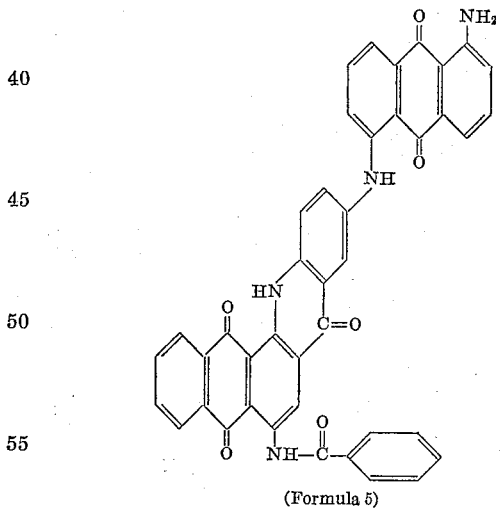

(Formula 5)

(b) 12.9 parts of the anthrimide obtained according to Example 2a are suspended in finely divided form in 200 parts of nitrobenzene and, after adding 5 parts of benzoyl chloride, are heated to 180–190° C. until a sample which has been filtered off and dried no longer shows any starting material. The substance is then filtered off at 100° C., washed in the usual way and dried. The acridone anthrimide which is obtained has the same dyeing properties as the anthrimide described in Example 1a and, when carbazolised in accordance with Example 1b, produces a similar dyestuff. It dyes cotton a khaki colour; the colour of the solution in sulphuric acid is a greenish-tinged blue.

(c) The reaction of 1 mol. of 4-benzoylamino-5'-bromanthraquinone-2,1(N)-1',2'(N)-benzacridone with 0.4 mol. of 1,5-diaminoanthraquinone (10 hours at 210–220° C.) in the manner described in Example 1a gives an acridone anthrimide of the following constitution (Formula 6):

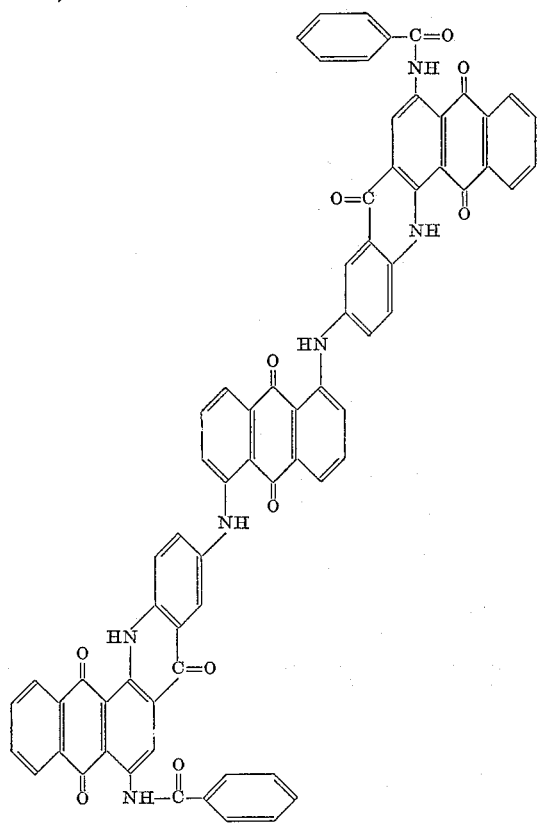

(Formula 6)

This is soluble in concentrated sulphuric acid with a brownish-yellow colour and dyes cotton a corinth colour. The dyestuff obtained therefrom in a manner according to Example 1b by carbazolisation at 90–120° C. is soluble in concentrated sulphuric acid with a bluish-tinged green colour and dyes cotton with brown tones. The dyestuff can be characterized by the following Formula 7:

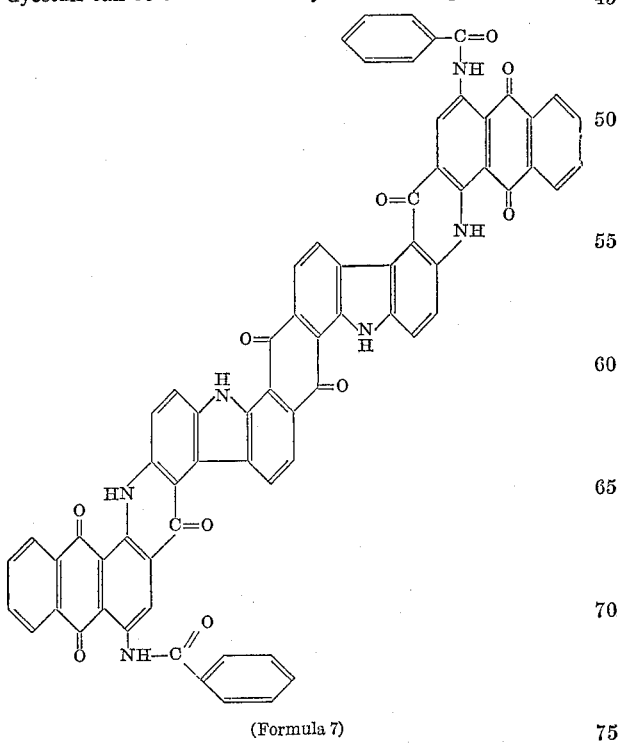

(Formula 7)

*Example 3*

(a) 26.2 parts of 4-benzoylamino-5'-bromanthraquinone-2, 1(N)-1',2'(N)-benzacridone are introduced while stirring and within one hour into a mixture heated to 205° C. and consisting of 12 parts of 1,5-diaminoanthraquinone, 7 parts of potassium carbonate, 2 parts of anhydrous sodium acetate, 1 part of copper acetate, 0.2 part of copper powder and 450 parts of napththalene-reacted for 4 hours at 210° C., whereafter 19 parts of 1-chloro-5-benzoylaminoanthraquinone, 5 parts of potassium carbonate, 1 part of copper acetate and 0.2 part of copper powder are added and the mixture is stirred for another 8 hours at 210° C. The melt is worked up in the same way as described in Example 1a. The acridone anthrimide, which has the following constitution, is soluble in concentrated sulphuric acid with a yellowish-brown colour and dyes cotton a corinth colour from a red vat.

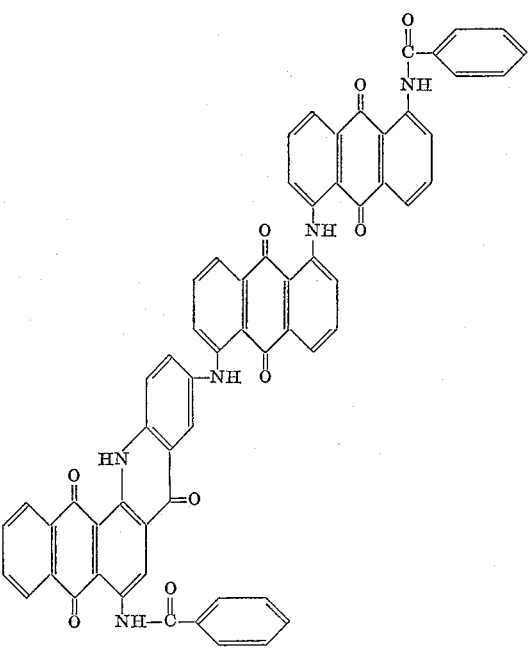

(Formula 8)

An acridone anthrimide with similar dyeing properties is obtained from 4-benzoylamino-5'-bromanthraquinone-2,1(N) - 1',2'(N) - benzacridone and 1-amino-5-chloranthraquinone and subsequent reaction with 1-amino-5-benzoylaminoanthraquinone.

(b) 10 parts of the anthrimide obtained according to Example 3a are introduced at 90° C. into a

NaCl/AlCl₃/So₂ melt prepared according to Example 1b, heated while stirring for 3 hours at 90° C. while passing over a weak current of sulphur dioxide and thereafter the melt is worked up in accordance with Example 1b. The dyesuff is soluble with a greenish-tinged blue colour in concentrated sulphuric acid and dyes cotton a brown colour from a red vat. The dyeings are of excellent fastness. The dyestuff has the following Formula 9:

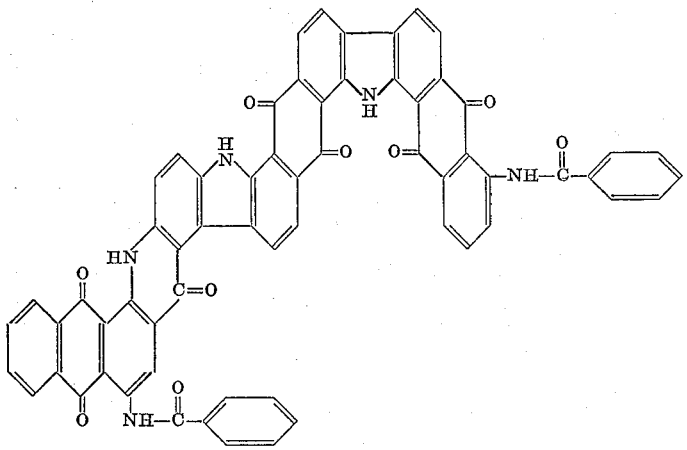

(Formula 9)

*Example 4*

(a) A mixture of 18.1 parts of 4-(o-bromobenzylamino - 5' - bromanthraquinone - 2,1(N) - 1',2'(N) - benzacridone, 24.7 parts of 1-amino-5-benzoylaminoanthraquinone, 11 parts of potassium carbonate, 3 parts of anhydrous sodium acetate, 1 part of copper acetate, 0.5 part of copper powder and 450 parts of naphthalene are reacted while stirring for 6 hours at 210° C. and thereafter the melt is worked up in the manner described in Example 1a. The acridone anthrimide of the following constitution is soluble in concentrated sulphuric acid with a yellowish-brown colour and dyes cotton a violet-tinged blackfish-brown colour from a red vat.

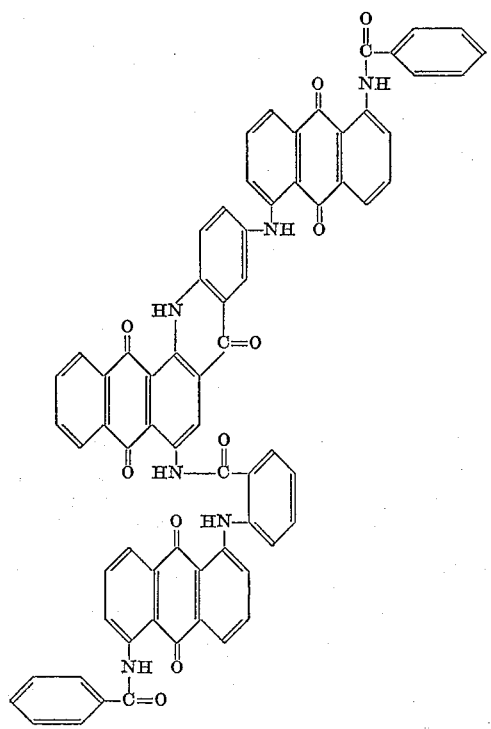

(Formula 10)

(b) 10 g. of the anthrimide obtained according to Example 4a are carbazolised at 70° C. for 4 hours, in a manner analogous to Example 1b. The dyestuff, which can be further purified after drying by boiling with high-boiling point organic solvents, such as quinoline, dimethyl formamide, etc., is soluble with a greenish-tinged blue colour in concentrated sulphuric acid and dyes cotton with bronze tones of very good fastness properties from a red vat. The dyestuff can be characterized by the following Formula 11:

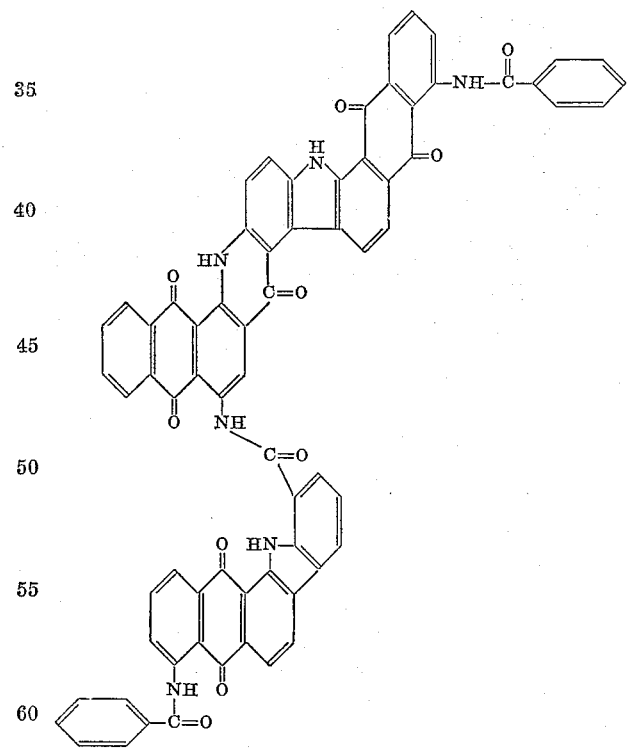

(Formula 11)

A similar dyestuff is obtained by acylation of the 4-amino - 5' - bromanthraquinone - 2,1(N) - 1',2'(N)-benzacridone with the acid chloride of 1,2-(3'-benzoylaminophthaloyl)-carbazole-8-carboxylic acid [prepared from 1-benzoylamino-4-(o-carbomethoxyanilido) anthraquinone by carbazolisation with nitrobenzene/aluminum chloride and saponification of the ester in the vat] and reaction of the acylation product with the corresponding quantity of 1-amino-5-benzoylaminoanthraquinone respectively 1,5-diaminoanthraquinone and subsequent carbazolisation in accordance with Examples 4a and 4b.

We claim:
1. A dyestuff of the formula
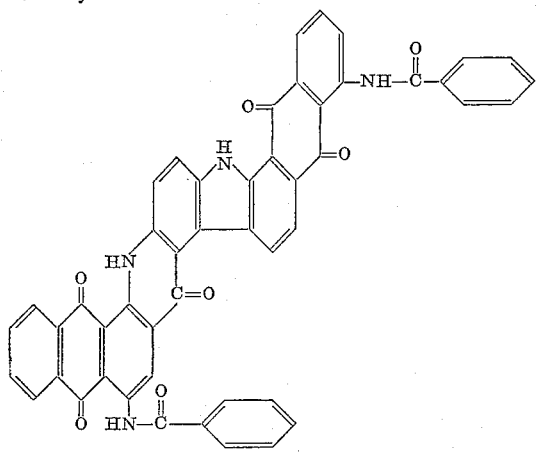
2. A dyestuff of the formula
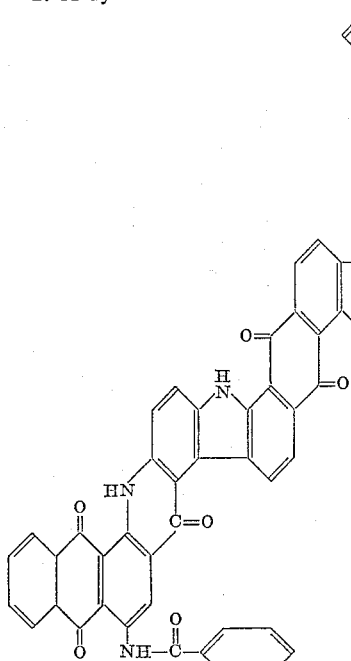
3. A dyestuff of the formula
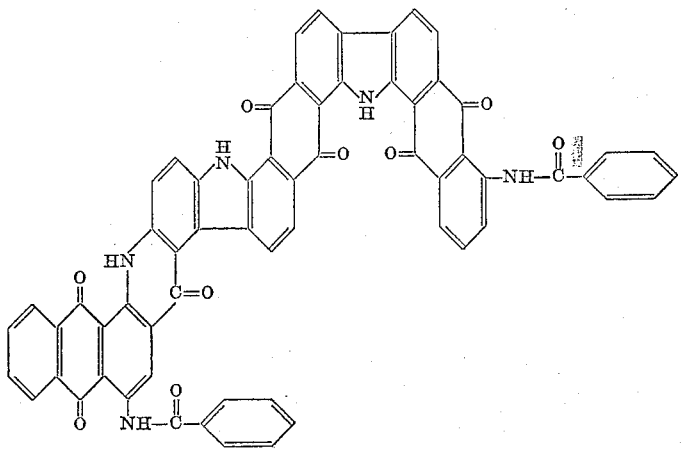
4. A dyestuff of the formula
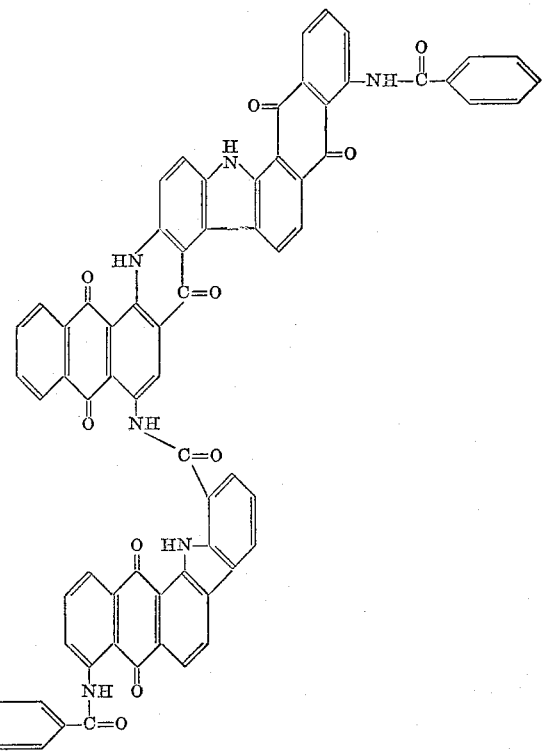
References Cited in the file of this patent
UNITED STATES PATENTS
| | | |
|---|---|---|
| 2,086,843 | Bauer | July 13, 1936 |
| 2,238,209 | Bauer et al. | Apr. 15, 1941 |
| 2,501,645 | Max et al. | Mar. 21, 1950 |